United States Patent [19]
Chemali et al.

[11] Patent Number: 5,239,267
[45] Date of Patent: Aug. 24, 1993

[54] METHOD FOR IMPROVING THE ACCURACY OF DIP DETERMINATION USING ADJUSTABLE HIGH PASS FILTERS

[75] Inventors: Roland E. Chemali; Shey-Min Su, both of Austin; Joseph F. Goetz, Katy, all of Tex.

[73] Assignee: Halliburton Logging Services, Inc., Houston, Tex.

[21] Appl. No.: 700,275

[22] Filed: May 15, 1991

[51] Int. Cl.$^5$ .................. G01V 3/34; G01V 3/38; G01V 3/18; G01V 3/00
[52] U.S. Cl. .................. 324/376; 324/351
[58] Field of Search .................. 324/339, 351, 367

[56] References Cited

U.S. PATENT DOCUMENTS

| | | | |
|---|---|---|---|
| 3,405,350 | 10/1968 | Tanquy | 324/367 |
| 3,638,105 | 11/1972 | Shuster | 324/351 |
| 3,691,456 | 9/1972 | Warren | 324/351 |

Primary Examiner—Walter E. Snow
Attorney, Agent, or Firm—William J. Beard

[57] ABSTRACT

The present system is directed to an improved dipmeter system including plural sensors on isolated pads around a sonde. An independent output is formed from each of the sensor pads, and each output is provided to its own adjustable high pass filter. The several high pass filters delete low frequency constituents in the sensor signals. Then, the signals are provided to a dipmeter computer to determine depth with greater accuracy. As a variation, the high pass filters can be selectively adjusted to provide an adjustable frequency for the filters, and one version utilizes the derivative of the dipmeter signal as a function of velocity or time.

4 Claims, 5 Drawing Sheets

METHOD FOR IMPROVING THE ACCURACY OF DIP DETERMINATION USING ADJUSTABLE HIGH PASS FILTERS

BACKGROUND OF THE DISCLOSURE

A dipmeter is a device equipped with at least three sensor pads mounted on arms extending outwardly from a sonde which is lowered into a well borehole to make measurements. The several sensor pads supported on the sonde include similar detectors which are typically capable of measuring some physical parameter of the adjacent formations. Indeed, four arms are commonly used and six such arms can be used with a highly precise system. For instance, resistivity can be the parameter of interest and it is commonly measured by dipmeters to provide an output indicating dip. As known in the art, a single geological feature or event is located in common to three or more of the dipmeter curves. For instance, in contrasting the resistivity of a rock formation to a salt water saturated porous sand, there is a marked difference in resistance. This creates a common excursion in the signals for all of the sensor pads which detect the rock-sand interface just described and creates in the curve the common feature. The curve provides a signal which physically is located along the path of the particular pad sensor moving along the borehole of the well and provides this signal at the intersection of the borehole with the particular geological feature. Three such sensor pads will determine the dip of the interface of the geological feature; if there are four, this provided redundancy so that the dip angle of the geological feature can be double checked. With six arms, greater redundancy is achieved and greater accuracy in measurement of the geological feature can then be obtained.

The sharpness of the signal is in some fashion dependent on the relative diameter of the sensors on the pad. It also depends on the depth of investigation into the formations adjacent to the borehole. Measurements extend somewhat into the formation, and having a finite diameter at the pad sensor, they effectively measure the geological features giving rise to signal changes at a depth into the adjacent formations; in effect, the measurements are made as though the pad sensors were deployed at a diameter somewhat larger than the physical diameter of the borehole. Typically, borehole diameter is measured with a caliper which is normally mounted on the same tool. Thus, the caliper may measure the borehole diameter to some specific distance, but the diameter of the measured region is somewhat larger than the caliper measured diameter.

This problem can be countered somewhat by simply substituting a large diameter. For instance, if a 7.625 inch drill bit is used and the hole formed thereby is approximately 8 inches in diameter, various models used heretofore have suggested that the measurement diameter or the electrical diameter is the calipered diameter plus about 0.5 inches. This charge in diameter has been supported for sensors on a dipmeter making measurements in an oil based mud. However, in using a sensor pad supporting a focused resistivity sensor the depth of investigation is somewhat larger and suggests a diameter in excess of measured diameter by about two inches. In the example noted, the eight inch borehole will then involve an effective or electrical diameter of ten inches. Even worse, the two inch modification will vary as a function with the contrast in resistivity between the formation dynamically opposite the sensor and the resistivity of the borehole fluids. If two inches is the diameter at the depth of investigation, there will be a very substantial range of errors incorporated in the dipmeter measurements. The present procedure enables a dipmeter of any number of arms to make measurements from the several sensor pads carried on the arms of the device, and assists in controlling the filtering of the dipmeter signals so that the resistivity log from the dipmeter can be modified before determining the formation dip, thereby resulting in improved dip determinations.

The present procedure utilizes a multi-arm dipmeter system having four or six sensor pads in the preferred embodiment wherein resistivity measurements are made; each sensor pad forms its own output and the outputs are provided through a logging cable from the dipmeter tool supported on the logging cable in a well borehole, and these signals are delivered to the surface. Each signal is provided to an adjustable high pass filter. After filtering to reduce or reject certain low frequency components, the signal is then provided to a dip measure computer which makes determinations of dip. This data is then provided to a recorder also having an input from a depth measuring device so that dip events can be located as a function of depth in the well borehole. Moreover, the adjustable high pass filter is provided with a variable frequency set point in accordance with the teachings of the present disclosure. This assists in reducing low frequency content of a specified frequency band, and thereby enables the system to respond to dipping events with greater accuracy. Any possible ambiguity as a result of the depth investigation which implicitly modifies the diameter of the borehole is thereby reduced, and errors in measurement are thereby reduced.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1A:
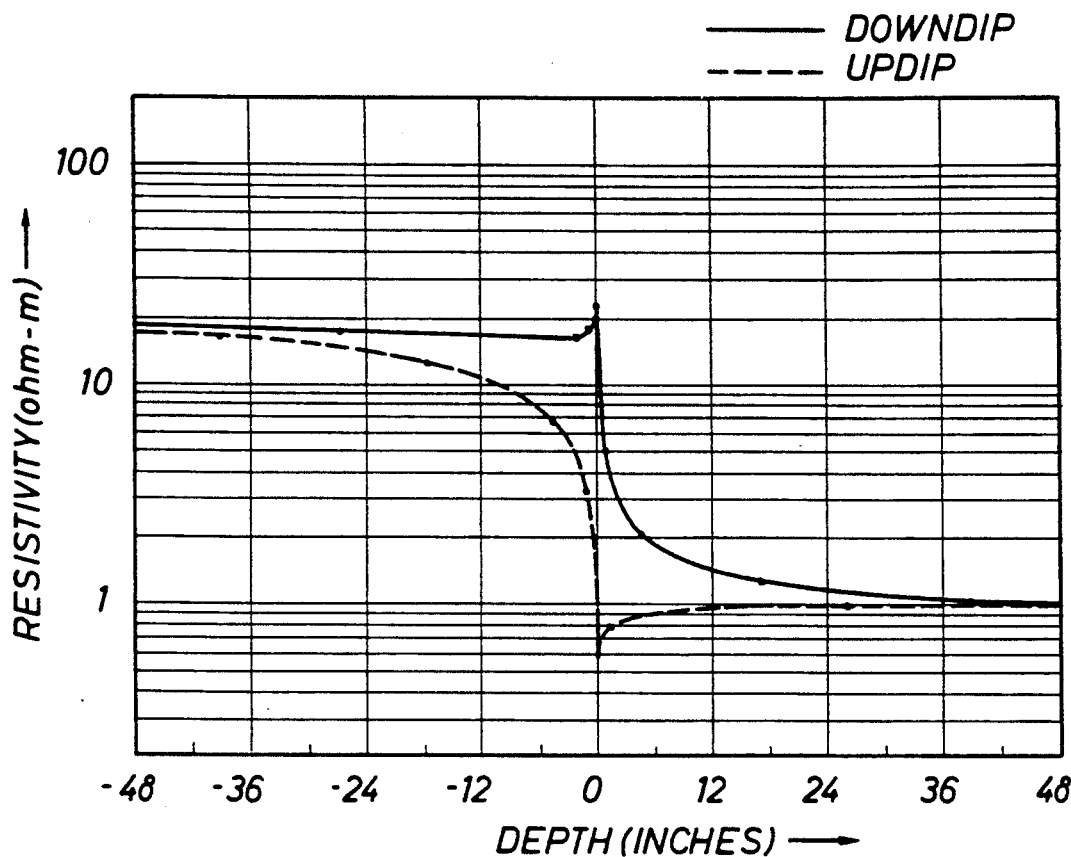
FIGS. 1A and 1B show curves from the dipmeter with a formation at a dip of sixty degrees in a representative borehole and in particular shows how changes in resistivity between two adjacent strata is anticipated in the curves of FIG. 1A while the curves of FIG. 1B show correlation of the logs as a function of depth and displacement.
Figure 1B:
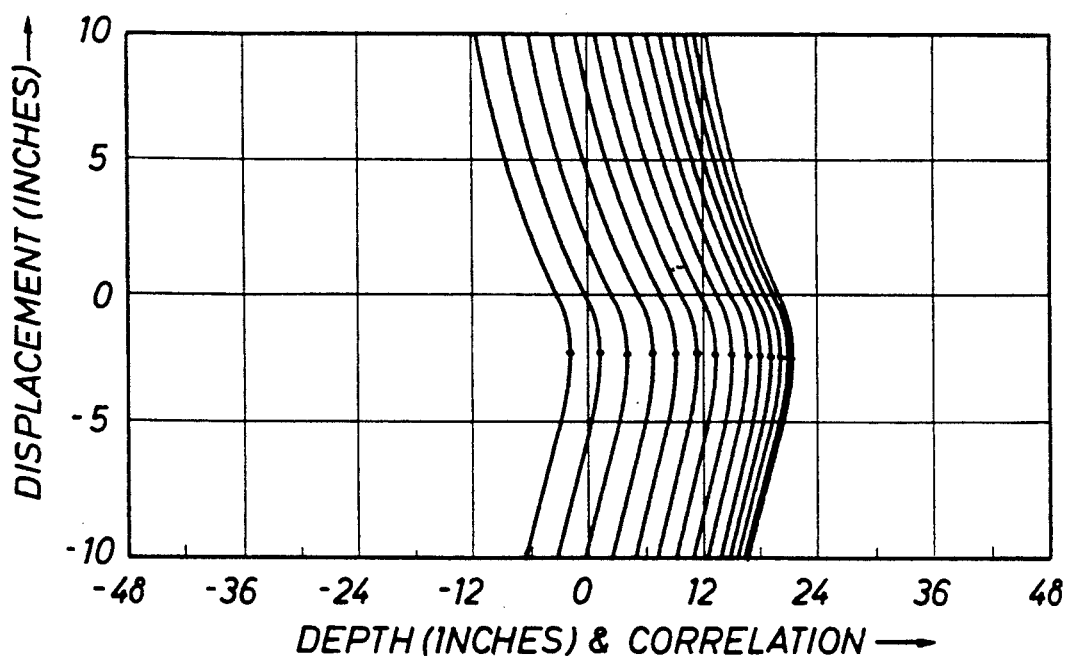

Attention is first directed to FIGS. 1A, 1B, 2A & 2B of the drawings. Considered jointly, they show the resistivity measurements of a dipmeter comprised of six arms deploying sensor pads around a sonde which is pulled upwardly in a well borehole. The measurements in FIGS. 1A, 1B, 2A and 2B in particular show what occurs as an inference between adjacent strata is approached. In FIGS. 1A and 1B, for instance, one strata has an apparent or a measured resistivity measurement of about eighteen ohm-meters, and the adjacent strata has an apparent or a measured resistivity of about one ohm-meters. This dipmeter was operated in a borehole of twelve inches diameter. When approaching the interface between the two adjacent strata, the solid curve represents the data which would be obtained from one direction while the dotted line represents the data obtained when approaching from the opposite direction. As will be understood, the two curves are very similar and both involve the anticipation of the other strata. This anticipation derives in part from the fact that the sensor pad utilizes sensors of a finite width which make an investigation at a finite depth, that is, a depth which is beyond the wall of the borehole. For example, if the borehole is twelve inches in diameter as noted in this particular example, the depth of investigation may provide data for a hole which is much larger, perhaps sixteen inches in diameter as opposed to the twelve inches which is obtained by a caliper normally positioned on the sonde with the dipmeter. The depth at which the strata interface is investigated is extremely useful in determining the dip of the formation.

The family of curves in FIG. 1B show the correlation of the log signal output for resistivity as a function of displacement and depth as indicated. As will be understood, the measuring instrument (referring to the sensors on the pads) has finite width or diameter and has a finite depth of investigation which creates some degree of uncertainty in the data. This uncertainty gives rise to errors in dip determination because it is difficult to know precisely where the peak might occur representative of a change in resistivity from one strata to the next.

Figure 2A:
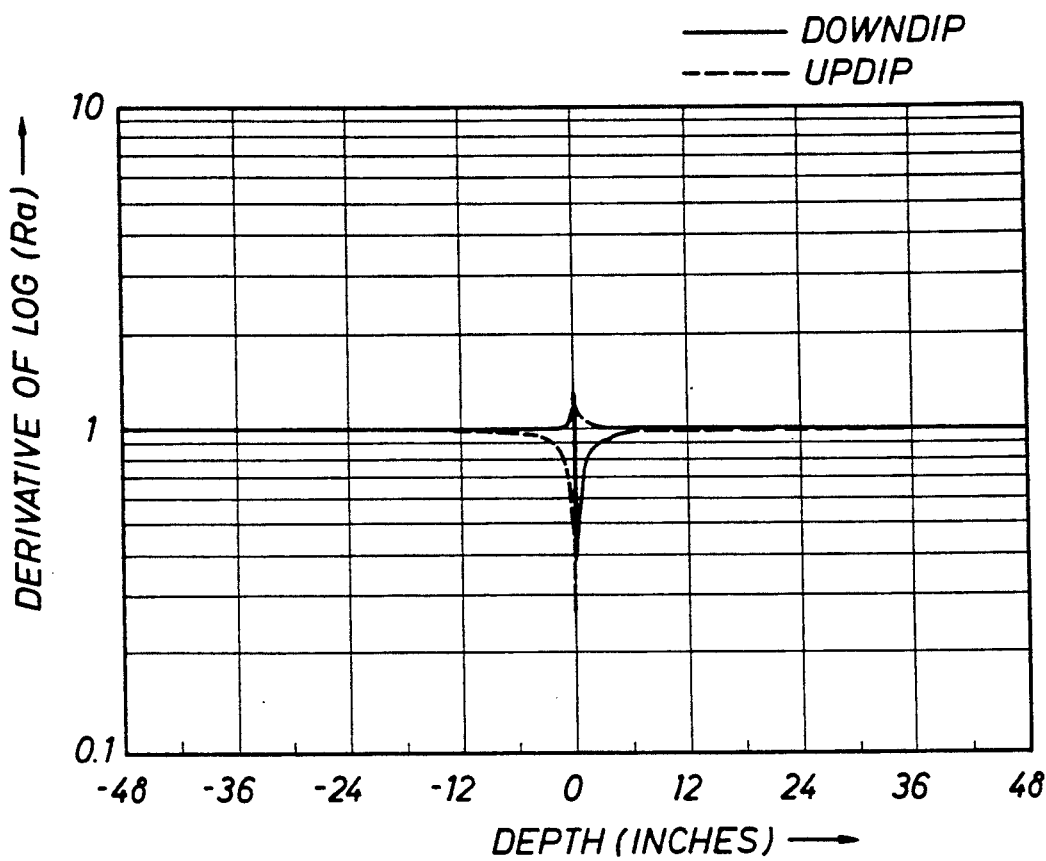
FIGS. 2A and 2B show data from the same formation as shown in FIGS. 1A and 1B wherein the data is represented as a derivative of measurements in the ordinates of the drawings.
Figure 2B:
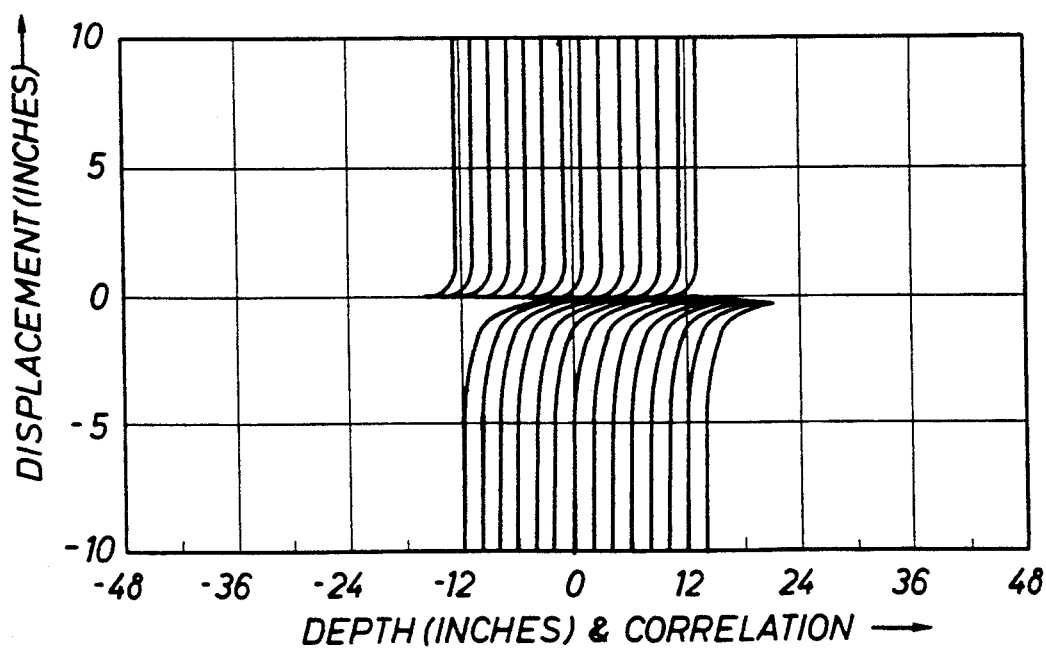
Figure 3A:
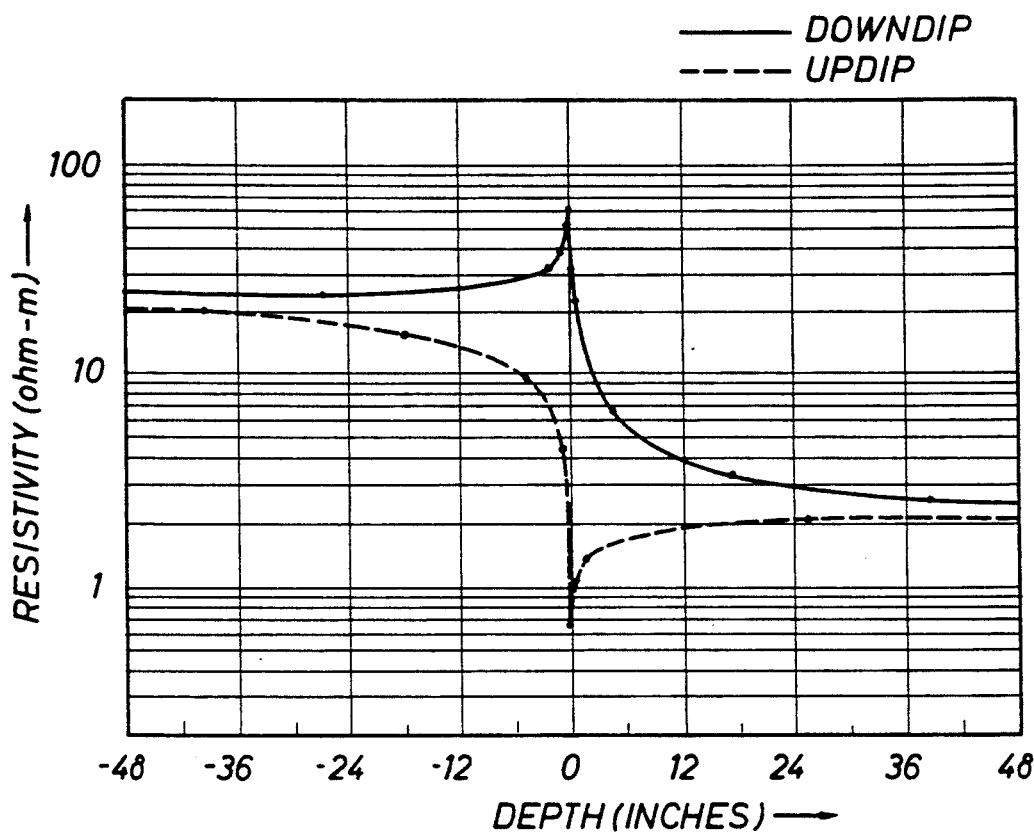
FIGS. 3A, 3B, 4A and 4B are similar to FIGS. 1A, 1B, 2A and 2B showing similar data presented in the same fashion.
Figure 3B:
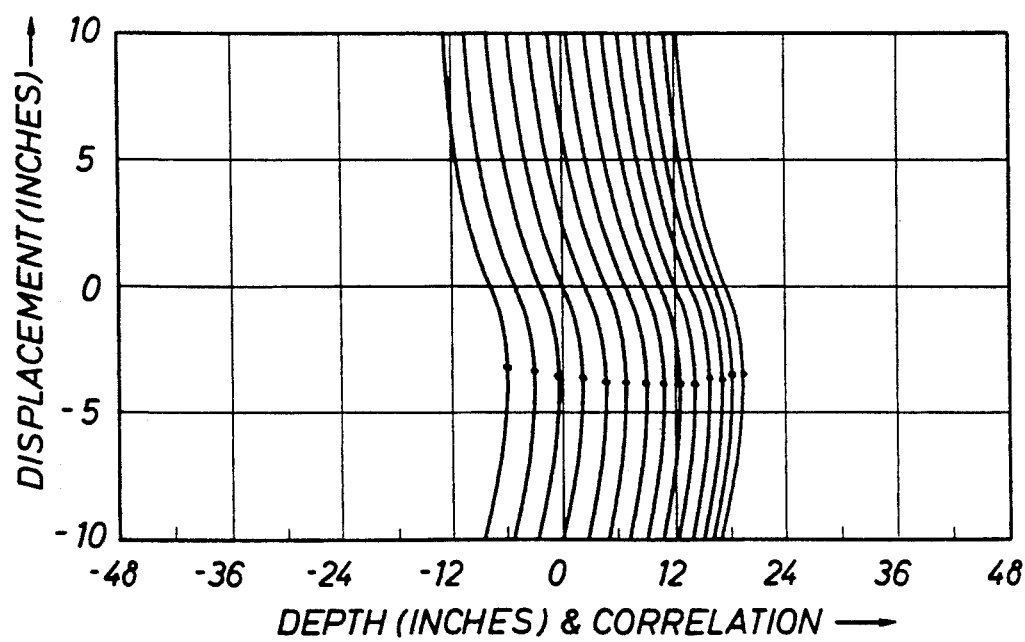
Figure 4A:
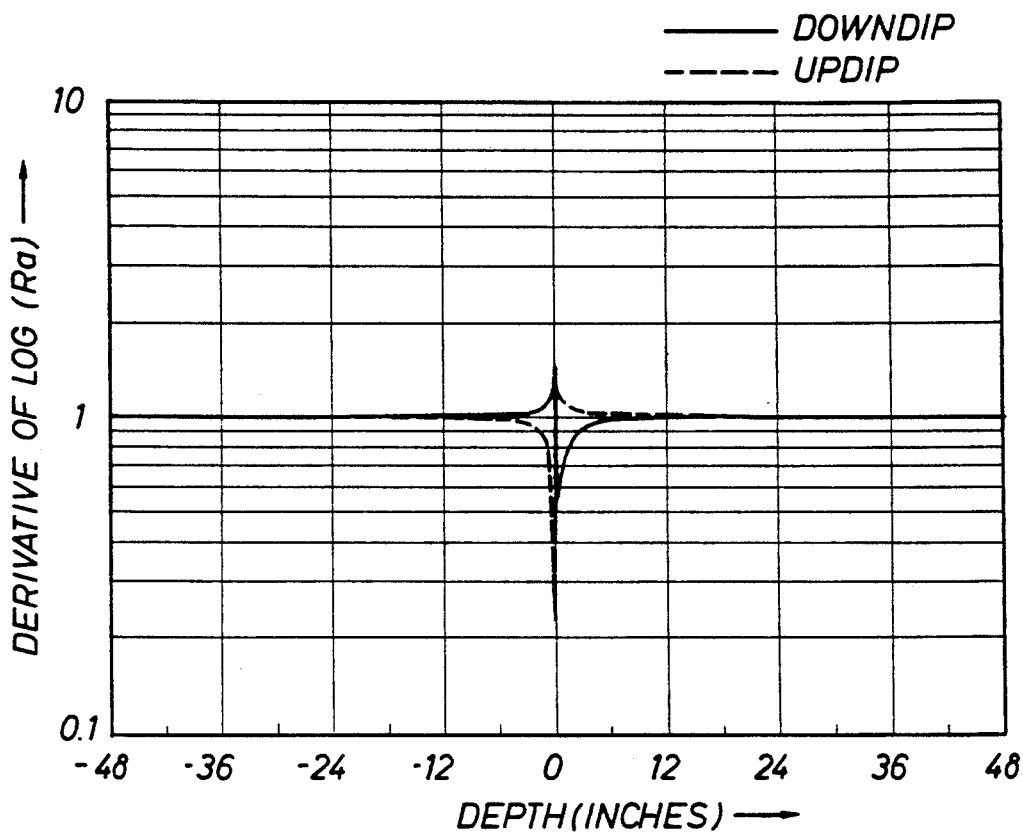
Figure 4B:
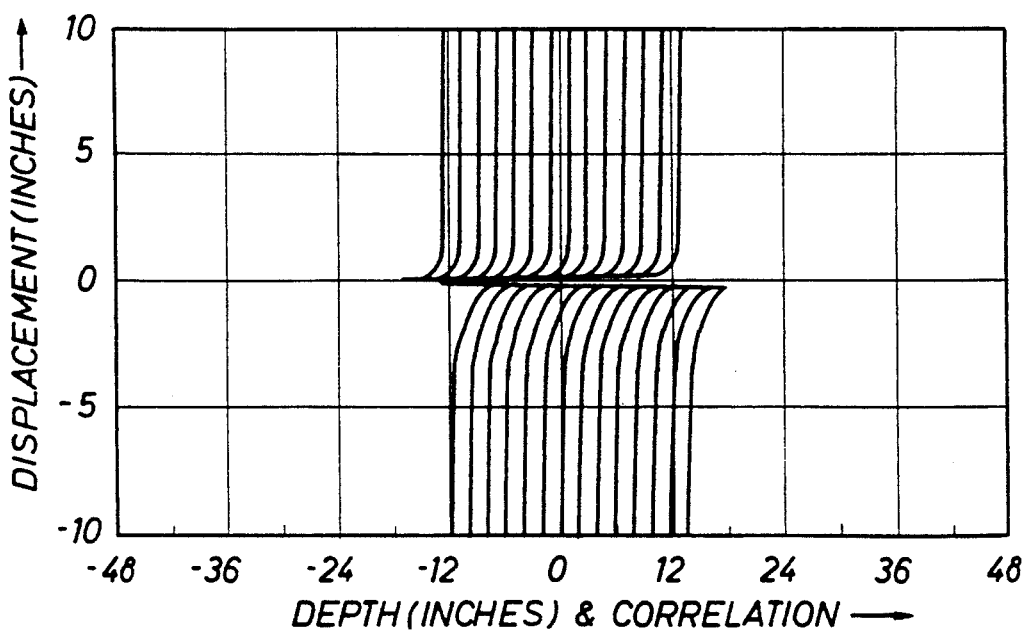

FIGS. 2A and 2B show the same data of FIGS. 1A and 1B where the same data is represented as a derivative. There, the slope of the curve (meaning the derivative) of the signal is indicated. Moreover, the sharp correlation shown in FIGS. 2A and 2B is much more useful than the rather gradual correlation which is evidenced in FIGS. 1A and 1B.

FIGS. 3A, 3B, 4A and 4B represent very similar data except that it is obtained from a formation traversed by a borehole filled with a much more conductive fluid. Again, the correlation utilizing only the unmodified log data is less contrasted while it is shown much more sharply in the derivative values of FIGS. 4A and 4B. The teaching noted with regard to FIGS. 1A, 1B, 2A and 2B is equally applicable to FIGS. 3A, 3B, 4A and 4B.

Figure 5:
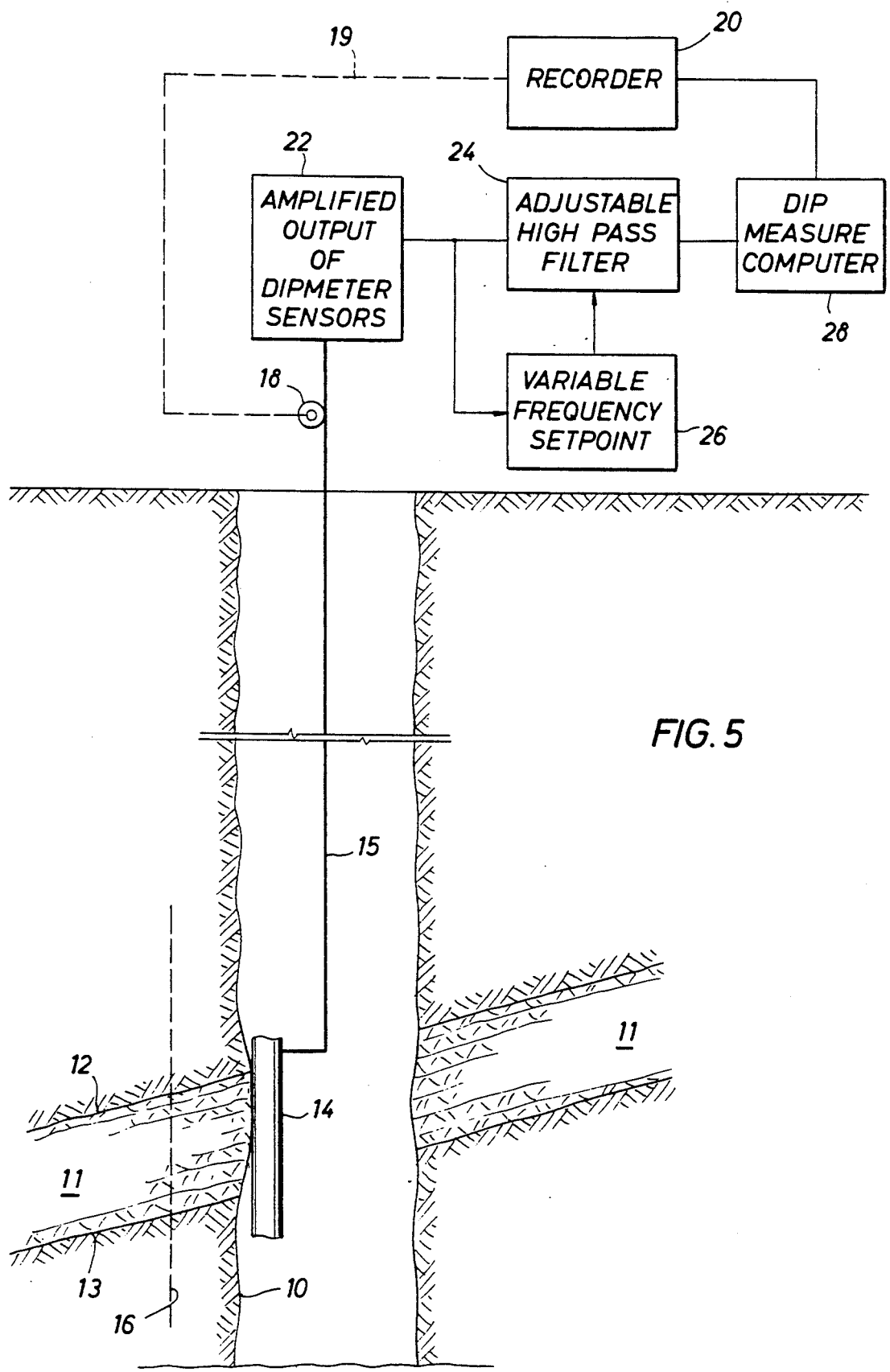
FIG. 5 is a schematic block diagram of a dipmeter system modified in accordance with the teachings of the present disclosure and incorporating a dipmeter computer with recorder for recording a more accurate determination of dip as a function of depth.

An apparatus for carrying out the present procedure is now shown in FIG. 5 of the drawings. The FIG. 5 apparatus is shown in the context of an open hole well. Briefly, a well 10 is shown in an open hole condition. It intercepts a strata 11 which has a lower interface and an upper interface. The tool is normally pulled upwardly, and is on the verge of making measurements at the upper interface 12, the lower interface 13 having been measured earlier in time. The numeral 14 identifies a single sensor pad which is mounted on a sonde (omitted for the sake of clarity), it being understood that three, four or even six similar sensor pads are positioned on the sonde to make measurements. All the pads operate in the same fashion and it is believed unnecessary to represent all of the pads. In like fashion, all of the pads provide an output signal on a conductor 15 which extends upwardly through a well logging cable extending to the surface. The logging cable is normally constructed with an external sheath which wraps the several conductors in the cable. The several conductors provide the signals to the surface necessary for the determination to be described. Moreover, the sonde normally supports a caliper tool which measures the diameter of the well borehole at the location where the measurements are being taken. The caliper thus provides a mechanical measurement of diameter which is also provided to the surface. The caliper has also been omitted for the sake of clarity. The numeral 16 indicates a larger diameter which is in the form of a dotted line in FIG. 5 and which represents the depth of investigation of the device. The depth of investigation is variable depending on a number of factors including the relative resistivity of the drilling fluid in the well borehole, and also the relative resistivities of the two formations defining the interface 12. Thus, the dotted line represents a kind of extended region where measurements are nevertheless focused or centered and the investigation will be at the depth. The present invention provides a system whereby this form of caliper distortion is reduced and ideally avoided.

The logging cable including the conductor 15 extends to the surface where it passes over a sheave 18. The sheave measures movement of the logging cable. The sheave is connected with a mechanical or electrical depth measuring system 19 which provides a signal to a recorder 20. The depth measuring apparatus 19 is connected from the sheave to the recorder to enable correlation of the measurements as a function of depth in the well borehole 10. The logging cable 15 is connected with suitable surface located equipment which provides an amplified output of the dipmeter sensors at 22. In turn, the measured and amplified sensor output is delivered to an adjustable high pass filter 24. That has an adjustable high pass frequency setpoint; that setpoint is moved by means of a variable frequency setpoint adjustment at 26. After filtering, the sensor signal is then provided to a dip measure computer 28 which then connects with the recorder 20. As will be understood, a minimum of three and preferably four to six signals are provided and each of the several signals is processed in the fashion just described. Accordingly, there are separate adjustable high pass filters 24, one for each of the dipmeter sensor signals. The several filtered signals are thus input to the dipmeter computer 28 which forms the dip of the interface 12 between the adjacent strata.

One of the important aspects of the present apparatus is that the variable frequency setpoint can be determined dynamically as will be observed on looking at FIGS. 2A, 2B, 4A and 4B, or it can be arbitrarily set. For instance, low frequency content can be cut out at frequencies of 50 hertz or less, perhaps 200 hertz, 500 hertz, etc. This adjustment is made based on a number of factors and can be arbitrarily input to thereby control operation of the adjustable high pass filter 24. Alternately, the output signal from the sensor provided to the adjustable high pass filter 24 is used. This approach is to take the derivative of the signal as a function of depth; since the sonde supporting the sensor pad moves at an approximately fixed rate, this realistically permits obtaining the derivative as a function of time as well as a function of depth so that time and depth can be used interchangeably when the tool moves at a relatively fixed velocity. After filtration, and by removing a portion of the signal and particularly that portion which in the low frequency range determined by the setpoint for the filter 24, dipmeter calculations can then be determined in the ordinary fashion.

The foregoing procedure can be implemented in hardware by means of a specific setpoint filter which has an adjustable high pass band, or which has an adjustment defining the frequency which is rejected. Alternately, this can be accomplished in data processes by inputting the signal from a particular sensor and by performing a spectrum analysis accompanied with a frequency rejection at a fixed or variable frequency level. In either case, the conventional dipmeter calculation is carried out by the computer 28 thereafter so that formation dip is then obtained and is input to the recorder 20. This enables determination of the dip of the interface 12. The formation 11 is located by making measurements during movement of the dipmeter to find both the bottom and later the top interfaces of the particular strata 11.

One mode of execution is suggested; in the conventional fashion, one curve (unfiltered) is used to determine a first value of dip in conjunction with other (unfiltered) pad curves. This provides a first dip estimate, obviously subject to greater than normal error resulting from using unfiltered data. The curves are then filtered mildly and form a set of curves from which a second dip estimate is derived by searching in the vicinity of the first dip estimate. By iterating this process, and in particular changing to a more severe filtering routine, the dip curve can be formed with the desired filtering level, and the data is much more accurate.

While the foregoing is directed to the preferred embodiment, the scope thereof is determined by the claims which follow.

What is claimed is:

1. A method of improving the accuracy of dip angle determination of a dipmeter as a function of depth in a well borehole incorporating six or more sensor pads extending outwardly from a sonde and comprising the steps of:
    (a) forming a sensor measurement output signal at a sensor pad supported on the dipmeter sonde which supports at least six sensor pads;
    (b) passing each of the sensor measurement output signals through one of a plurality of high pass filters each of which is individually adjustable to a variable frequency setpoint which is dependent on the derivative with respect to time of the sensor signal and which defines the high pass band of said filter in order to remove selected low frequency components from the sensor pad output signals; and
    (c) repeating steps (a) and (b) in time parallel operation with three or more separate dipmeter sensor pad output signals to provide selected separate high pass filtered sensor output signals for determining formation dip as a function of borehole depth.

2. The method claim 1 which further includes the step of:
    (d) telemetering said sensor pad out put signals to the surface of the well borehole and performing the filtering steps digitally in a service dipmeter digital computer.

3. The method of claim 2 further including the step of:
    (e) correcting the computed formation dip for the depth of investigation into the formation of each of said sensor pad signals.

4. The method of claim 3 further including the step of:
    (f) moving the dipmeter sonde along the well borehole suspended on a logging cable and measuring the logging cable movement in the well borehole to obtain depth of the sonde in the borehole.

* * * * *